United States Patent
Mine et al.

(10) Patent No.: US 10,434,385 B2
(45) Date of Patent: Oct. 8, 2019

(54) GOLF CLUB HEAD AND GOLF CLUB

(71) Applicants: Mizuno Technics Corporation, Gifu (JP); Mizuno Corporation, Osaka (JP)

(72) Inventors: Takayuki Mine, Gifu (JP); Tetsuya Oono, Gifu (JP); Tatsuya Wakako, Gifu (JP); Kei Tsuji, Osaka (JP)

(73) Assignee: MIZUNO TECHNICS CORPORATION, Osaka (JP)

( * ) Notice: Subject to any disclaimer, the term of this patent is extended or adjusted under 35 U.S.C. 154(b) by 0 days.

(21) Appl. No.: 16/037,043

(22) Filed: Jul. 17, 2018

(65) Prior Publication Data
US 2019/0022481 A1 Jan. 24, 2019

(30) Foreign Application Priority Data
Jul. 19, 2017 (JP) .................. 2017-140182

(51) Int. Cl.
| | |
|---|---|
| A63B 53/06 | (2015.01) |
| A63B 53/04 | (2015.01) |
| A63B 60/52 | (2015.01) |
| A63B 60/04 | (2015.01) |
| F16B 37/04 | (2006.01) |

(52) U.S. Cl.
CPC .......... *A63B 53/06* (2013.01); *A63B 53/0466* (2013.01); *A63B 60/04* (2015.10); *A63B 60/52* (2015.10); *A63B 2053/0433* (2013.01); *A63B 2053/0491* (2013.01); *F16B 37/045* (2013.01)

(58) Field of Classification Search
CPC .................................. A63B 53/0466
USPC ................................. 473/324–350
See application file for complete search history.

(56) References Cited

U.S. PATENT DOCUMENTS

| | | | |
|---|---|---|---|
| 2,067,556 A | 1/1937 | Wettlaufer | |
| 2,767,609 A | 10/1956 | Cousino | |
| 7,166,041 B2 | 1/2007 | Evans | |
| 7,824,280 B2 * | 11/2010 | Yokota | A63B 53/04 |
| | | | 473/334 |

(Continued)

FOREIGN PATENT DOCUMENTS

| | | |
|---|---|---|
| GB | 703967 A | 2/1954 |
| JP | 2001333999 A | 12/2001 |

(Continued)

OTHER PUBLICATIONS

European Search Report issued in related application No. EP18184024.0 dated Dec. 10, 2018.

(Continued)

*Primary Examiner* — Alvin A Hunter
(74) *Attorney, Agent, or Firm* — Troutman Sanders LLP; Daniel Sharpe (57) ABSTRACT

A golf club head includes a face, a sole, and a weight member. The sole includes a guide groove having a plurality of positioning grooves. The weight member includes a plurality of protrusions, and is positioned in the guide groove with the plurality of protrusions engaging with the plurality of positioning grooves. The plurality of positioning grooves each include a pair of sidewalls formed in an arc shape and a bottom connecting the sidewalls to each other. The plurality of protrusions each include a pair of side surfaces formed in an arc shape and a ridge connecting the side surfaces to each other.

9 Claims, 8 Drawing Sheets

(56) References Cited

U.S. PATENT DOCUMENTS

| | | | |
|---|---|---|---|
| 8,016,694 B2 * | 9/2011 | Llewellyn | A63B 53/0466 473/334 |
| 8,202,175 B2 * | 6/2012 | Ban | A63B 53/0466 473/338 |
| 8,968,116 B1 | 3/2015 | Myers et al. | |
| 9,174,096 B2 * | 11/2015 | Sargent | A63B 53/0466 |
| 9,610,479 B2 | 4/2017 | Barelmann et al. | |
| 9,682,296 B1 | 6/2017 | Myers et al. | |
| 10,046,212 B2 * | 8/2018 | Sargent | A63B 53/06 |
| 10,188,916 B2 * | 1/2019 | Harbert | A63B 53/0466 |
| 2008/0261715 A1 * | 10/2008 | Carter | A63B 53/0466 473/291 |
| 2010/0075773 A1 | 3/2010 | Casati, Jr. | |
| 2010/0087281 A1 | 4/2010 | Kotula | |
| 2011/0009209 A1 * | 1/2011 | Llewellyn | A63B 53/0466 473/336 |
| 2012/0172142 A1 | 7/2012 | Yashiki | |
| 2015/0251060 A1 | 9/2015 | Oldknow et al. | |
| 2015/0297961 A1 * | 10/2015 | Voshall | A63B 53/06 473/335 |
| 2015/0306473 A1 | 10/2015 | Breier et al. | |
| 2015/0306474 A1 * | 10/2015 | Breier | A63B 53/0466 473/332 |
| 2015/0314173 A1 | 11/2015 | Bolane et al. | |
| 2015/0321055 A1 * | 11/2015 | Golden | A63B 53/0466 473/338 |
| 2016/0051869 A1 * | 2/2016 | Foster | A63B 53/06 473/335 |
| 2016/0059093 A1 * | 3/2016 | Nielson | A63B 53/02 473/338 |
| 2016/0129323 A1 * | 5/2016 | Myers | A63B 53/0466 473/338 |
| 2017/0072277 A1 * | 3/2017 | Mata | A63B 53/06 |
| 2017/0136321 A1 * | 5/2017 | Gibbs | A63B 53/0466 |
| 2017/0173413 A1 * | 6/2017 | Cleghorn | A63B 53/0466 |
| 2017/0312593 A1 * | 11/2017 | Myers | A63B 53/0466 |
| 2017/0326420 A1 * | 11/2017 | Kingston | A63B 53/06 |
| 2017/0326421 A1 * | 11/2017 | Myers | A63B 53/06 |
| 2018/0117427 A1 * | 5/2018 | Knutson | A63B 53/0466 |
| 2018/0178092 A1 * | 6/2018 | Johnson | A63B 53/0466 |
| 2018/0345093 A1 * | 12/2018 | Harbert | A63B 53/0466 |
| 2019/0022478 A1 * | 1/2019 | Greaney | A63B 53/0466 |
| 2019/0022480 A1 * | 1/2019 | Harbert | A63B 53/0466 |
| 2019/0022481 A1 * | 1/2019 | Mine | A63B 53/0466 |

FOREIGN PATENT DOCUMENTS

| | | | |
|---|---|---|---|
| JP | 2010252964 A | * | 11/2010 |
| JP | 2011010722 A | * | 1/2011 |
| JP | 2011229914 A | | 11/2011 |
| JP | 2012139403 A | | 7/2012 |
| JP | 2016019731 A | | 2/2016 |

OTHER PUBLICATIONS

Office Action issued in related Japanese Patent Application No. 2017-140182 dated Jan. 22, 2019 (English Translation).

Office Action issued in related Japanese Patent Application No. 2017-140182 dated Jan. 22, 2019 (Japanese language).

* cited by examiner

GOLF CLUB HEAD AND GOLF CLUB

This nonprovisional application is based on Japanese Patent Application No. 2017-140182 filed on Jul. 19, 2017 with the Japan Patent Office, the entire contents of which are hereby incorporated by reference.

BACKGROUND OF THE INVENTION

Field of the Invention

The present invention relates to a golf club head and a golf club.

Description of the Background Art

Currently, golf club heads adjustable by users to meet desired characteristics have been proposed. For example, Japanese Patent Laying-Open No. 2016-19731 discloses a golf club head whose center of gravity is adjustable by adjustment of the position of a weight member in a channel disposed in the sole of the golf club head. The golf club head disclosed in the above-referenced publication has a plurality of locking protrusions formed in the channel, and the protrusions engage with a plurality of notches formed in the weight member to thereby position the weight member at a desired location in the channel. These locking protrusions that are each formed in a substantially hemispherical shape are spaced from each other.

In the golf club head disclosed in the above-referenced publication, the locking protrusions that are each formed in a semispherical shape are spaced from each other. Therefore, if the locking protrusions are displaced from the notches, the locking protrusions do not engage with the notches. It is thus difficult to adjust the weight member (weight) to a desired position.

SUMMARY OF THE INVENTION

The present invention has been made in view of the above problem, and an object of the invention is to provide a golf club head in which a weight member is easily adjustable to a desired position, as well as a golf club equipped with the golf club head.

A golf club head of the present invention includes a face, a sole, and a weight member. The sole continues from the face and includes a guide groove having a plurality of positioning grooves. The weight member includes a plurality of protrusions, is positionally adjustable along the guide groove of the sole, and is positioned in the guide groove with the plurality of protrusions engaging with the plurality of positioning grooves. The plurality of positioning grooves each include a pair of sidewalls and a bottom connecting the sidewalls of the pair to each other. The sidewalls of the pair are each formed in an arc shape bulging outward from the bottom. The sidewalls of the pair are formed to be separated further away from each other as a distance from the bottom increases. The plurality of protrusions each include a pair of side surfaces and a ridge connecting the side surfaces of the pair to each other. The side surfaces of the pair are each formed in an arc shape receding inward from the ridge. The side surfaces of the pair are formed to be separated further away from each other as a distance from the ridge increases.

Regarding the golf club head of the present invention, the sidewalls of the pair are each formed in an arc shape, and the side surfaces of the pair are each formed in an arc shape. Therefore, when a plurality of protrusions are to be engaged with a plurality of positioning grooves, respective ridges of the plurality of protrusions are movable along the pair of sidewalls of the plurality of positioning grooves. It is therefore easy to engage the ridges of the plurality of protrusions with the bottoms of the plurality of positioning grooves. Accordingly, it is easy to adjust the weight member to a desired position.

Regarding the golf club head, preferably each of the side surfaces of the pair is larger in radius of curvature than each of the sidewalls of the pair. Therefore, the height of the ridge can be made larger than the depth of the bottom. Accordingly, even when the ridges are worn so that the height of the ridges is reduced, the ridge can be held in the bottom.

Regarding the golf club head, preferably a pitch of the plurality of protrusions is an integral multiple of a pitch of the plurality of positioning grooves. Therefore, the ridges of the plurality of protrusions can be arranged in the bottoms of the plurality of positioning grooves. The weight member can thus be held firmly in the guide groove.

Regarding the golf club head, preferably the plurality of positioning grooves and the plurality of protrusions each extend in a direction crossing a face back direction. Therefore, each of the plurality of positioning grooves and the plurality of protrusions can be arranged to extend in the direction crossing the ball-striking direction. Accordingly, movement of the weight member due to impact at ball hitting can be suppressed.

Regarding the golf club head, preferably the guide groove includes a pair of inner walls facing each other, and a pair of flanges each projecting from a corresponding one of the inner walls of the pair in a direction in which the inner walls of the pair face each other. The flanges of the pair are each provided with the plurality of positioning grooves. The weight member includes: an upper portion; a bottom portion disposed with the pair of flanges interposed between the upper portion and the bottom portion; and a screw portion connecting the upper portion and the bottom portion to each other. Therefore, the upper portion can be positioned on the pair of flanges by the bottom portion and the screw portion. If the screw portion is pressed against the bottom of the guide groove so as to position the upper portion, it is necessary to increase the thickness of the bottom of the guide groove in order to ensure a sufficient strength of the guide groove, resulting in an increase of the weight of the sole and accordingly an increase of the weight of the golf club head. In contrast, the fact that the upper portion can be positioned on the pair of flanges by the bottom portion and the screw portion enables reduction of the weight of the golf club head.

Regarding the golf club head, preferably the guide groove includes a bottom, and a wide portion disposed between the pair of flanges and the bottom. A width of the wide portion is larger than a distance between the flanges. A width of the bottom portion in a lateral direction is smaller than the distance between the flanges. A length of the bottom portion in a longitudinal direction is larger than the distance between the flanges and smaller than the width of the wide portion. Therefore, the bottom portion can be rotated in the wide portion to be held in the guide groove. It is thus unnecessary to provide an opening laterally to the guide groove for example so as to allow the weight member to be inserted in the guide groove. Accordingly, the degree of freedom in design of the golf club head can be enhanced.

Regarding the golf club head, preferably the upper portion includes: a main body including one surface (first surface) and the other surface (second surface); and a projecting portion connected to at least one end of the other surface (second surface) of the main body. The projecting portion projects from the other surface (second surface) of the main body in a direction away from the one surface (first surface). It is therefore possible to enhance the strength of the weight member by the projecting portion.

A golf club of the present invention includes: a shaft; a grip attached to one end of the shaft; and a golf club head according to any one of the foregoing, the golf club head being attached to another end of the shaft opposite to the grip. It is therefore possible to provide a golf club equipped with a golf club head in which a weight member is easily adjustable to a desired position.

As seen from the foregoing, the present invention can provide a golf club head in which a weight member is easily adjustable to a desired position, as well as a golf club equipped with the golf club head.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are described below based on the drawings.

Referring first to FIGS. 1 to 7, a description is given of a configuration of a golf club head 10 in an embodiment of the present invention. The following description is of a wood-type golf club head as an example of golf club head 10 in an embodiment of the present invention. Golf club head 10 in an embodiment of the present invention is also applicable to utility golf club heads.

Figure 1:
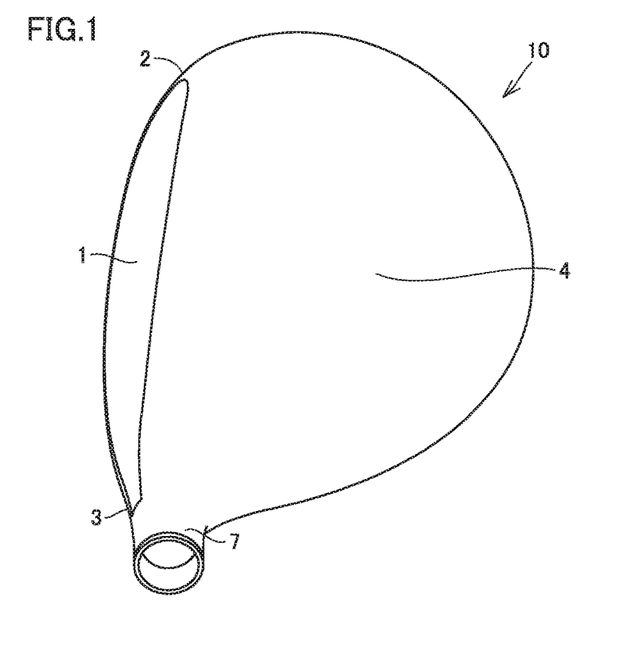
FIG. 1 is a top view schematically showing a configuration of a golf club head in an embodiment of the present invention.
Figure 2:
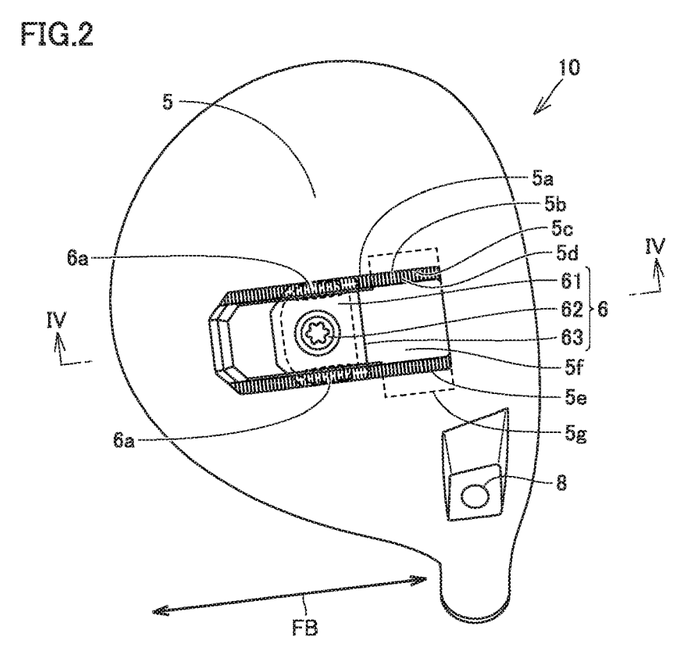
FIG. 2 is a bottom view schematically showing the configuration of the golf club head in an embodiment of the present invention.

As shown in FIGS. 1 and 2, golf club head 10 mainly includes a face 1, a toe 2, a heel 3, a crown 4, a sole 5, a weight member 6, and a hosel 7. The material for each of face 1, toe 2, heel 3, crown 4, sole 5, weight member 6, and hosel 7 is stainless, for example.

Face 1 has a ball striking surface. Face 1 has a sweet spot on the ball striking surface. A sweet area is formed around the sweet spot on the ball striking surface of face 1. On the ball striking surface, a plurality of score lines (not shown) may be formed. A direction which is orthogonal to the ball striking surface and in which face 1 and the rearmost end of golf club head 10 are opposite to each other as seen in plan view is face back direction FB.

On the side away from hosel 7, toe 2 connects crown 4 and sole 5 to each other. Toe 2 continues from face 1. Heel 3 is a portion extending from the bottom end of hosel 7 to sole 5. Heel 3 continues from face 1. Heel 3 is opposite to toe 2 with face 1 interposed therebetween. The direction in which toe 2 and heel 3 are opposite to each other is toe-heel direction. The toe-heel direction is orthogonal to face back direction FB.

Crown 4 is a portion forming an upper part of golf club head 10. Crown 4 is arranged to cover the upper surface of sole 5. Crown 4 continues from face 1. Sole 5 is a portion forming a bottom part of golf club head 10. Sole 5 continues from face 1. Sole 5 is opposite to crown 4. The direction in which crown 4 and sole 5 are opposite to each other is crown-sole direction. Hosel 7 is a portion to be connected to a shaft 30 shown in FIG. 10. With hosel 7 connected to shaft 30, golf club head 10 is secured to shaft 30 by an attachment member (not shown) inserted in an attachment hole 8.

Figure 3:
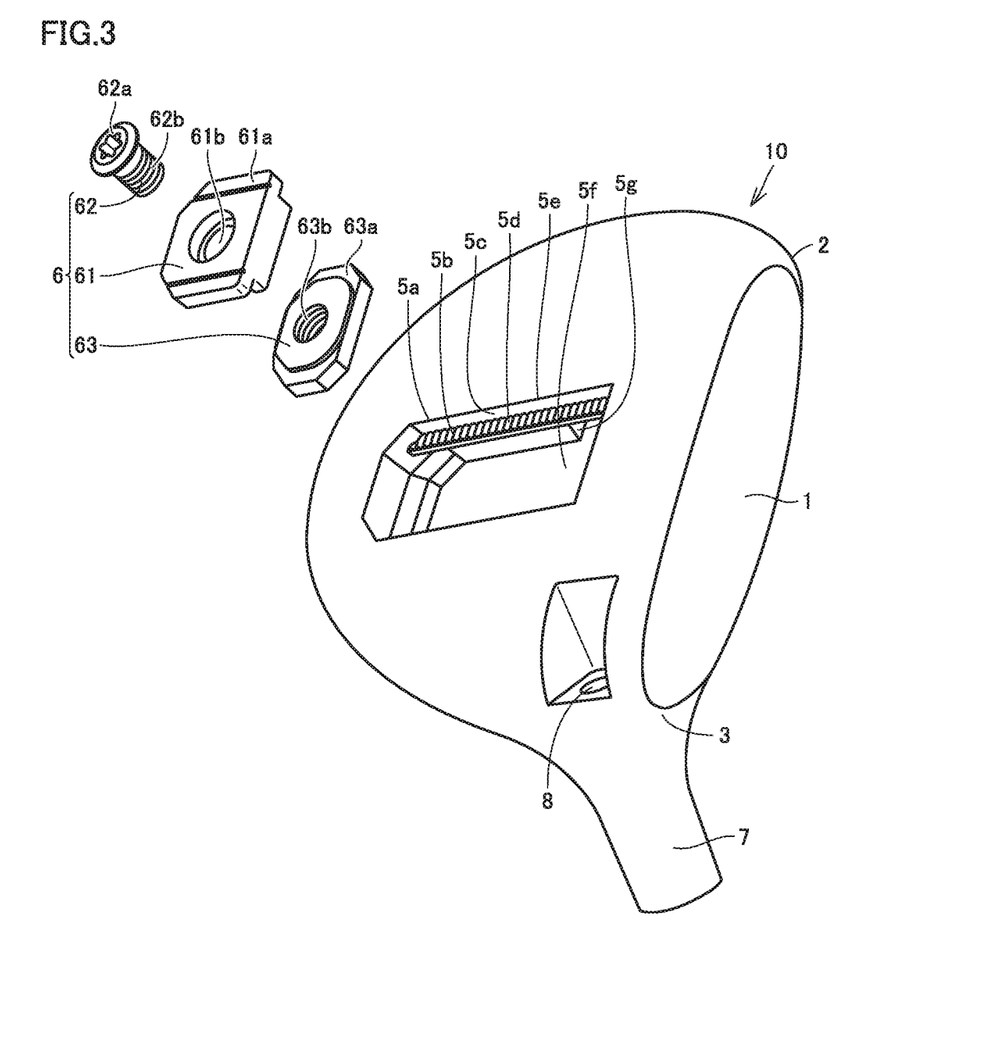
FIG. 3 is a perspective view schematically showing the configuration of the golf club head in an embodiment of the present invention.
Figure 4:
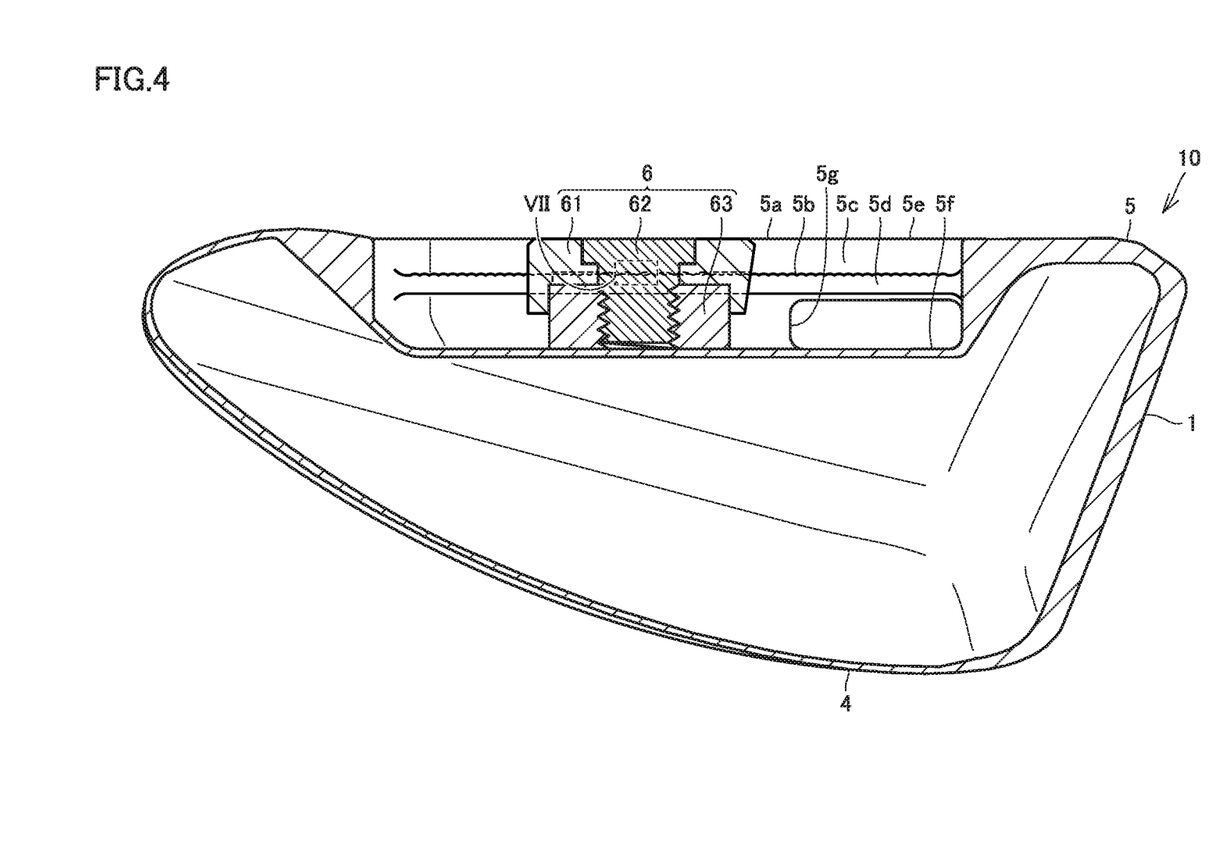
FIG. 4 is a cross-sectional view along line IV-IV in FIG. 2.

As shown in FIGS. 2 to 4, sole 5 has a guide groove 5a. Guide groove 5a extends in face back direction FB. Guide groove 5a has a plurality of positioning grooves 5b. Weight member 6 includes a plurality of protrusions 6a. The position of weight member 6 is adjustable along guide groove 5a of sole 5. Movement of weight member 6 along guide groove 5a enables the center of gravity position of golf club head 10 to move in face back direction FB. Weight member 6 is positioned in guide groove 5a with a plurality of protrusions 6a engaged with a plurality of positioning grooves 5b. Weight member 6 has a weight for example of not less than 15 g and not more than 20 g, preferably 17 g. A plurality of positioning grooves 5b and a plurality of protrusions 6a each extend in a direction crossing face back direction FB.

Guide groove 5a includes a pair of inner walls 5c and a pair of flanges 5d. Inner walls 5c of the pair are arranged to face each other. Flanges 5d of the pair each extend from a corresponding one of inner walls 5c of the pair in the direction in which inner walls 5c of the pair face each other. Flanges 5d of the pair are each provided with a plurality of positioning grooves 5b. Guide groove 5a includes an opening 5e. Weight member 6 is inserted from opening 5e into guide groove 5a. Flanges 5d of the pair are each provided with a plurality of positioning grooves 5b in the opening 5e-side surface of each flange.

Weight member 6 includes an upper portion 61, a screw portion 62, and a bottom portion 63. Upper portion 61 includes a main body 61a and a through hole 61b formed in main body 61a. Screw portion 62 includes a head 62a and a shaft 62b. The diameter of head 62a is larger than the diameter of shaft 62b. The diameter of head 62a is larger than the diameter of through hole 61b. Shaft 62b is provided with threads. Bottom portion 63 includes a base 63a and a through hole 63b formed in base 63a. In through hole 63b, thread grooves with which the threads of shaft 62b can engage are formed. Screw portion 62 connects upper portion 61 and bottom portion 63 to each other. Bottom portion 63 is disposed with a pair of flanges 5d interposed between bottom portion 63 and upper portion 61. Upper portion 61 has a portion facing each of flanges 5d of the pair, and this portion is provided with a plurality of protrusions 6a.

Screw portion 62 is configured to change the distance between upper portion 61 and bottom portion 63. Specifically, tightening of screw portion 62 reduces the distance between upper portion 61 and bottom portion 63 in the axial direction of shaft 62b of screw portion 62. Accordingly, a plurality of protrusions 6a are brought into contact with a plurality of positioning grooves 5b to thereby secure weight member 6 in guide groove 5a. On the contrary, loosening of screw portion 62 increases the distance between upper portion 61 and bottom portion 63 in the axial direction of shaft 62b of screw portion 62. Separation of a plurality of protrusions 6a from a plurality of positioning grooves 5b by a distance larger than the depth of positioning groove 5b enables a plurality of protrusions 6a not to be in contact with a plurality of positioning grooves 5b. Accordingly, weight member 6 becomes movable with respect to guide groove 5a. Weight member 6 can thus be moved along guide groove 5a to a desired position and screw portion 62 can be tightened again to thereby fix weight member 6 at this position. In this way, weight member 6 is adjustable to a desired position with respect to guide groove 5a.

Guide groove 5a includes a bottom 5f and a wide portion 5g. The pair of flanges 5d is arranged between opening 5e and bottom 5f. The width of opening 5e is larger than the distance between flanges 5d of the pair. The length of upper portion 61 in the longitudinal direction is larger than the distance between flanges 5d of the pair and smaller than the width of opening 5e. The longitudinal direction of guide groove 5a is the direction in which flanges 5d of the pair extend in parallel with each other. The lateral direction of guide groove 5a is the direction in which these flanges 5d face each other. The longitudinal direction and the lateral direction of guide groove 5a cross each other. Wide portion 5g is disposed between the pair of flanges 5d and bottom 5f. Wide portion 5g extends from the face-side end of guide groove 5a toward the back in the direction in which guide groove 5a extends. The position where wide portion 5g is provided is not limited to the face-side end of guide groove 5a in the longitudinal direction of guide groove 5a, but may be any position in guide groove 5a. The dimension of wide portion 5g in face back direction FB is larger than the width of bottom portion 63 in the lateral direction. The width of wide portion 5g is larger than the distance between flanges 5d of the pair. The width of bottom portion 63 in the lateral direction is smaller than the distance between flanges 5d of the pair. The length of bottom portion 63 in the longitudinal direction is larger than the distance between flanges 5d of the pair and smaller than the width of wide portion 5g.

Figure 5:
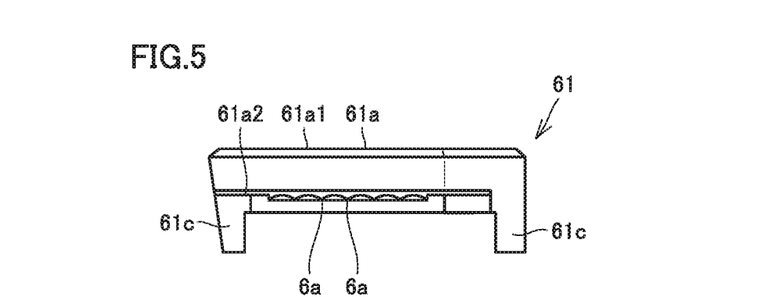
FIG. 5 is a side view schematically showing a configuration of a weight member of the golf club head in an embodiment of the present invention.
Figure 6:
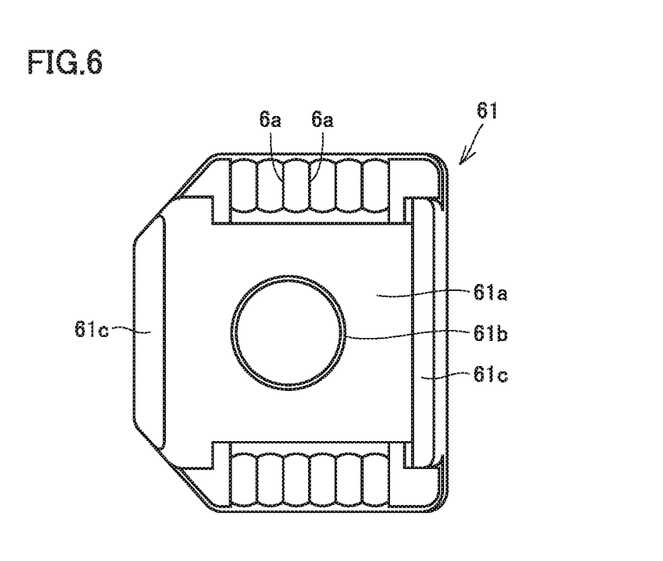
FIG. 6 is a plan view schematically showing the configuration of the weight member of the golf club head in an embodiment of the present invention.

As shown in FIGS. 5 and 6, upper portion 61 includes main body 61a and a projecting portion 61c. Main body 61a includes one surface 61a1 and the other surface 61a2. One surface 61a1 and the other surface 61a2 are located opposite to each other. Projecting portion 61c is connected to at least one end of the other surface 61a2 of main body 61a. In the present embodiment, a pair of projecting portions 61c is provided. Projecting portions 61c of the pair are connected to respective opposite ends of the other surface 61a2 of main body 61a. Projecting portion 61c projects from the other surface 61a2 of main body 61a in the direction away from one surface 61a1. Projecting portions 61c of the pair are arranged to face each other. The dimension of the pair of projecting portions 61c in the direction in which projecting portions 61c project from the other surface 61a2 is smaller than the dimension of main body 61a in the direction in which one surface 61a1 and the other surface 61a2 are opposite to each other. In the present embodiment, a pair of projecting portions 61c is provided, and therefore, upper portion 61 is formed in a shape of a channel (inverted U). Depending on the cross-sectional shape of upper portion 61, the stiffness of upper portion 61 can be ensured even when only one projecting portion 61c is provided. Therefore, projecting portion 61c may be connected to at least one end of the other surface 61a2 of main body 61a.

Figure 7:
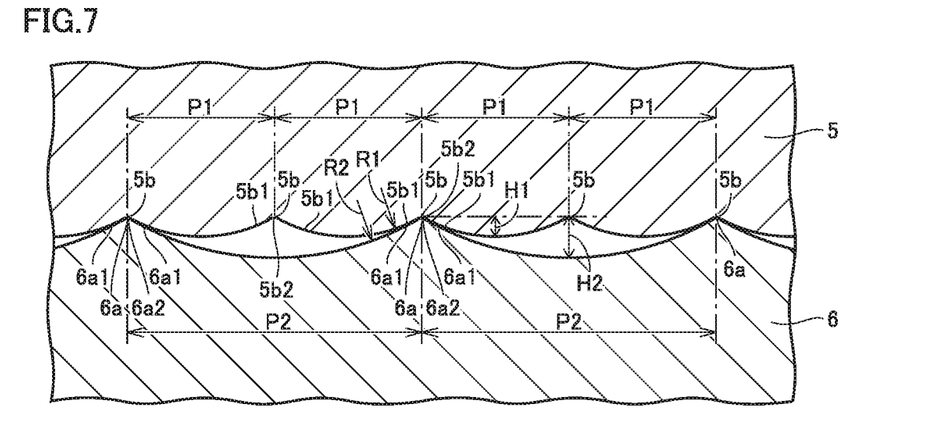
FIG. 7 is an enlarged view showing a plurality of positioning grooves and a plurality of protrusions in portion VII (the region defined by a broken line) in FIG. 4.

As shown in FIG. 7, a plurality of positioning grooves 5b each include a pair of sidewalls 5b1 and a bottom 5b2 connecting sidewalls 5b1 of the pair to each other. Sidewalls 5b1 of the pair are each formed in an arc shape bulging outward from bottom 5b2. Sidewalls 5b1 of the pair are formed to be separated further away from each other as the distance from bottom 5b2 increases. Sidewalls 5b1 adjacent to each other of a plurality of positioning grooves 5b are formed in the shape of continuing arcs. Sidewalls 5b1 adjacent to each other of a plurality of positioning grooves 5b are equal to each other in radius of curvature. Bottom 5b2 is linearly shaped. Bottom 5b2 extends in a direction crossing face back direction FB.

A plurality of protrusions 6a each include a pair of side surfaces 6a1 and an ridge 6a2 connecting side surfaces 6a1 of the pair to each other. Side surfaces 6a1 of the pair are each formed in an arc shape receding inward from ridge 6a2. Side surfaces 6a1 of the pair are formed to be separated further away from each other as the distance from ridge 6a2 increases. Side surfaces 6a1 adjacent to each other of a plurality of protrusions 6a are formed in the shape of continuing arcs. Side surfaces 6a1 adjacent to each other of a plurality of protrusions 6a are equal to each other in radius of curvature. Ridge 6a2 is linearly shaped. Ridge 6a2 extends in a direction crossing face back direction FB.

The radius of curvature of each of side surfaces 6a1 of the pair is larger than the radius of curvature of each of sidewalls 5b1 of the pair. Thus, the height H2 of ridge 6a2 is larger than the depth H1 of bottom 5b2. The height H2 of ridge 6a2 is the maximum dimension in the height direction among ridge 6a2 and the pair of sidewalls 5b1. The depth H1 of bottom 5b2 is the maximum dimension in the height direction among bottom 5b2 and the pair of side surfaces 6a1.

Pitch P2 of a plurality of protrusions 6a is an integral multiple of pitch P1 of a plurality of positioning grooves 5b. Pitch P2 of a plurality of protrusions 6a is preferably twice as large as pitch P1 of a plurality of positioning grooves 5b. Thus, the contact area between sidewall 5b1 and side surface 6a1 can be made larger than that when pitch P2 of a plurality of protrusions 6a is three times or more as large as pitch P1 of a plurality of positioning grooves 5b. Pitch P2 of a plurality of protrusions 6a is 1.5 mm, for example. Pitch P1 of a plurality of positioning grooves 5b is 0.75 mm, for example.

Pitch P2 of a plurality of protrusions 6a is the distance between respective ridges 6a2 of protrusions 6a adjacent to each other. More specifically, the pitch of a plurality of protrusions 6a is the maximum dimension in the width direction between respective ridges 6a2 of protrusions 6a adjacent to each other. Pitch P1 of a plurality of positioning grooves 5b is the distance between respective bottoms 5b2 of positioning grooves 5b adjacent to each other. More specifically, pitch P1 of a plurality of positioning grooves 5b is the maximum dimension in the width direction between respective bottoms 5b2 of positioning grooves 5b adjacent to each other.

Next, functions and effects of golf club head 10 in an embodiment of the present invention are described.

Regarding golf club head 10 in an embodiment of the present invention, sidewalls 5b1 of the pair are each formed in an arc shape, and side surfaces 6a1 of the pair are each formed in an arc shape. Therefore, when a plurality of protrusions 6a are to be engaged with a plurality of positioning grooves 5b, respective ridges 6a2 of a plurality of protrusions 6a are movable along a pair of sidewalls 5b1 of a plurality of positioning grooves 5b. It is therefore easy to engage ridges 6a2 of a plurality of protrusions 6a with bottoms 5b2 of a plurality of positioning grooves 5b. Accordingly, it is easy to adjust weight member 6 to a desired position.

The protrusions and recesses formed by the arcs of a plurality of positioning grooves 5b and a plurality of protrusions 6a are engaged with each other. Therefore, even when the protrusions are displaced from the recesses, the protrusions can be slid to be fit in corresponding recesses.

A plurality of positioning grooves 5b and a plurality of protrusions 6a enable weight member 6 to be disposed at any of a plurality of positions. The position of weight member 6 is thus adjustable.

Engagement of ridges 6a2 of a plurality of protrusions 6a with bottoms 5b2 of a plurality of positioning grooves 5b enables weight member 6 to be held firmly in guide groove 5a.

Contact of side surface 6a1 with sidewall 5b1 while ridges 6a2 of a plurality of protrusions 6a engage with bottoms 5b2 of a plurality of positioning grooves 5b also enables weight member 6 to be held firmly in guide groove 5a.

Regarding golf club head 10 in an embodiment of the present invention, each of side surfaces 6a1 of the pair has a radius of curvature larger than the radius of curvature of each of sidewalls 5b1 of the pair. Therefore, the height of ridge 6a2 can be made larger than the depth of bottom 5b2. Accordingly, even when ridges 6a2 are worn to be reduced in height, ridge 6a2 can still be held in bottom 5b2.

Regarding golf club head 10 in an embodiment of the present invention, pitch P2 of a plurality of protrusions 6a is an integral multiple of pitch P1 of a plurality of positioning grooves 5b. Therefore, respective ridges 6a2 of a plurality of protrusions 6a can be arranged in corresponding bottoms 5b2 of a plurality of positioning grooves 5b. Accordingly, weight member 6 can be held firmly in guide groove 5a.

Regarding golf club head 10 in an embodiment of the present invention, a plurality of positioning grooves 5b and a plurality of protrusions 6a each extend in a direction crossing face back direction FB. Therefore, each of a plurality of positioning grooves 5b and a plurality of protrusions 6a can be arranged to extend in a direction crossing the ball striking direction. Accordingly, movement of weight member 6 due to impact at ball striking can be suppressed.

Regarding golf club head 10 in an embodiment of the present invention, weight member 6 includes upper portion 61, bottom portion 63 to be arranged with a pair of flanges 5d interposed between bottom portion 63 and upper portion 61, and screw portion 62 connecting upper portion 61 and bottom portion 63 to each other. Therefore, upper portion 61 can be positioned on a pair of flanges 5d by bottom portion 63 and screw portion 62. If screw portion 62 is pressed against bottom 5f of guide groove 5a so as to position upper portion 61, it is necessary to increase the thickness of bottom 5f of guide groove 5a in order to ensure a sufficient strength of guide groove 5a, resulting in an increase of the weight of sole 5 and accordingly an increase of the weight of the golf club head. In contrast, the fact that upper portion 61 can be positioned on a pair of flanges 5d by bottom portion 63 and screw portion 62 enables reduction of the weight of golf club head 10.

Regarding golf club head 10 in an embodiment of the present invention, the width of wide portion 5g is larger than the distance between flanges 5d of the pair. The width of bottom portion 63 in the lateral direction is smaller than the distance between flanges 5d of the pair, and the length of bottom portion 63 in the longitudinal direction is larger than the distance between flanges 5d of the pair and smaller than the width of wide portion 5g. Therefore, bottom portion 63 can be rotated in wide portion 5g to be received in the space defined by the pair of flanges 5d and bottom 5f of guide groove 5a, without being dropped off. It is therefore unnecessary to provide an opening laterally to guide groove 5a for example so as to allow weight member 6 to be inserted in guide groove 5a. Accordingly, the degree of freedom in design of golf club head 10 can be enhanced.

Regarding golf club head 10 in an embodiment of the present invention, upper portion 61 includes main body 61a and projecting portion 61c connected to at least one end of the other surface 61a2 of main body 61a and projecting from the other surface 61a2 in the direction away from one surface 61a1. It is therefore possible to enhance the strength of weight member 6 by projecting portion 61c.

Figure 8:
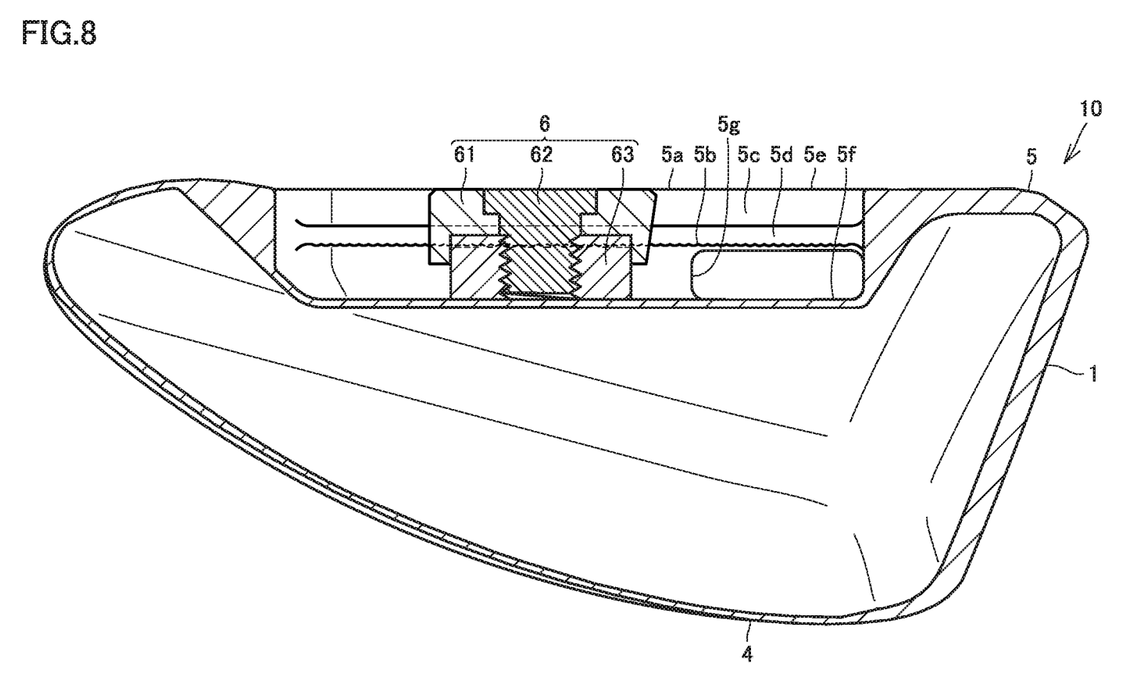
FIG. 8 is a cross-sectional view schematically showing a configuration of a golf club head in Modification 1 of an embodiment of the present invention.
Figure 9:
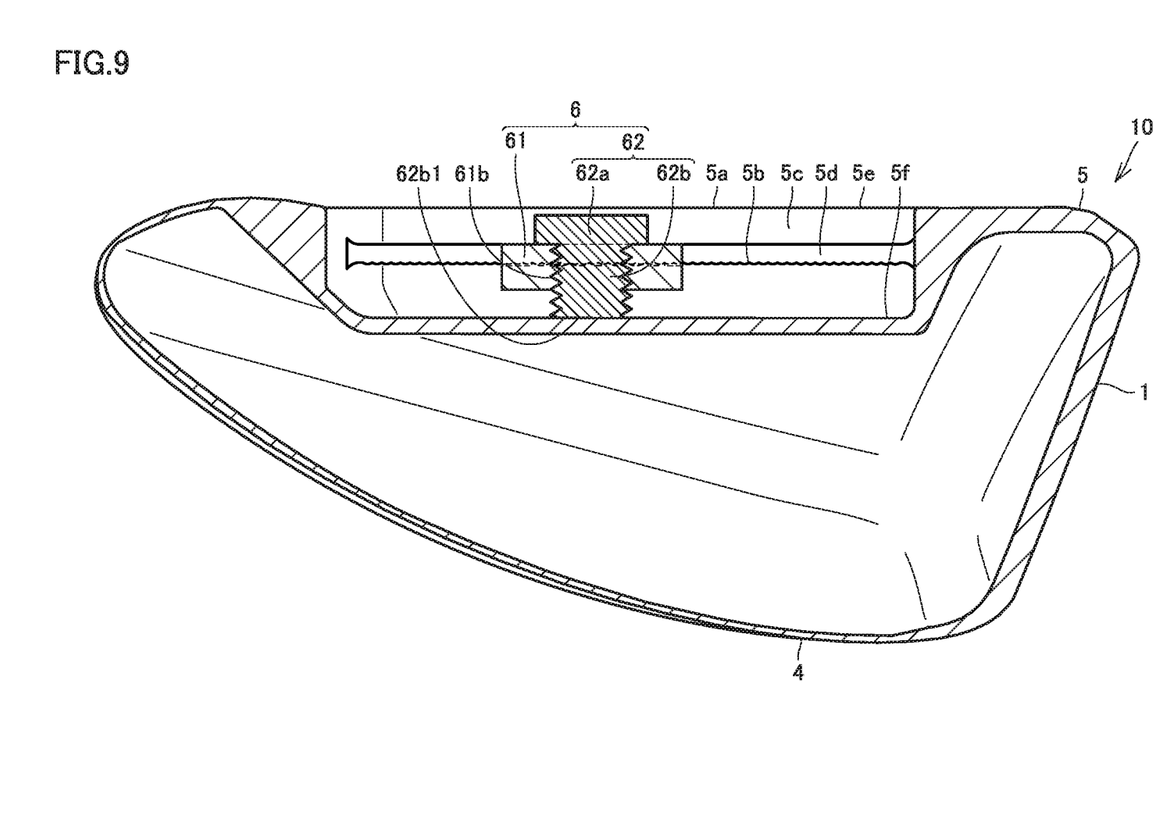
FIG. 9 is a cross-sectional view schematically showing a configuration of a golf club head in Modification 2 of an embodiment of the present invention.

Next, referring to FIGS. 8 and 9, each modification of the golf club head in an embodiment of the present invention is described. Unless otherwise specified, golf club head 10 of each modification has a similar configuration to the above-described configuration of golf club head 10 in an embodiment of the present invention. Golf club head 10 in each modification can also provide functions and effects similar to the above-described functions and effects of golf club head 10 in an embodiment of the present invention.

As shown in FIG. 8, a golf club head 10 in Modification 1 of an embodiment of the present invention differs from golf club head 10 in an embodiment of the present invention in terms of the configuration of guide groove 5a and weight member 6.

Regarding golf club head 10 in Modification 1 of an embodiment of the present invention, a plurality of positioning grooves 5b are formed in the bottom 5f-side surface of each flange 5d of the pair of flanges. A plurality of protrusions 6a are formed in a portion of bottom portion 63 that faces each flange 5d of the pair of flanges.

Golf club head 10 in Modification 1 of an embodiment of the present invention can also provide the above-described functions and effects of golf club head 10 in an embodiment of the present invention.

As shown in FIG. 9, a golf club head 10 in Modification 2 of an embodiment of the present invention differs from golf club head 10 in an embodiment of the present invention in terms of the configuration of guide groove 5a and weight member 6.

Regarding golf club head 10 in Modification 2 of an embodiment of the present invention, a plurality of positioning grooves 5b are formed in the bottom 5f-side surface of each flange 5d of the pair of flanges. Weight member 6 is made up of upper portion 61 and screw portion 62 and includes no bottom portion 63. A plurality of protrusions 6a are formed in a portion of upper portion 61 that faces each flange 5d of the pair of flanges.

In through hole 61b of upper portion 61, thread grooves with which threads of shaft 62b of screw portion 62 can engage are formed. The length of upper portion 61 in the longitudinal direction is smaller than the width of opening 5e. The width of upper portion 61 in the lateral direction is dimensioned to allow upper portion 61 to be brought into contact with a pair of inner walls 5c when screw portion 62 is tightened or loosened, so as to prevent upper portion 61 from rotating about shaft 62b of screw portion 62. Thus, upper portion 61 is configured not to rotate together with screw portion 62 about shaft 62b of screw portion 62 when screw portion 62 is tightened or loosened.

Tightening of screw portion 62 causes screw portion 62 to move, in the axial direction of shaft 62b, from the opening 5e-side of guide groove 5a toward bottom 5f. As screw portion 62 is moved in the axial direction of shaft 62b, a tip 62b1 of screw portion 62 is brought into contact with bottom 5f of guide groove 5a to hinder shaft 62b of screw portion 62 from moving further in the axial direction. Thus, as screw portion 62 is tightened, upper portion 61 is moved, in the axial direction of shaft 62b, from the bottom 5f-side of guide groove 5a toward opening 5e along a pair of inner walls 5c of guide groove 5a. Then, a plurality of protrusions 6a of upper portion 61 are brought into contact with a plurality of positioning grooves 5b formed in the bottom 5f-side surface of each of flanges 5d of the pair of flanges 5d, so as to secure weight member 6 in guide groove 5a.

In contrast, loosening of screw portion 62 causes screw portion 62 to move, in the axial direction of shaft 62b, from the bottom 5f-side of guide groove 5a toward opening 5e. Accordingly, a gap is generated between tip 62b1 of screw portion 62 and bottom 5f. This gap enables upper portion 61 to move in the axial direction of shaft 62b from the opening 5e-side toward bottom 5f. As a plurality of protrusions 6a are separated from a plurality of positioning grooves 5b by a distance larger than the depth of positioning grooves 5b, it is possible for a plurality of protrusions 6a not to be in contact with a plurality of positioning grooves 5b. Accordingly, weight member 6 becomes movable with respect to guide groove 5a. Then, weight member 6 can be moved along guide groove 5a to a desired position and screw portion 62 can be tightened again to fix weight member 6 at this position. In this way, weight member 6 can be adjusted to a desired position with respect to guide groove 5a.

Regarding golf club head 10 of Modification 2 in an embodiment of the present invention, screw portion 62 is pressed against bottom 5f of guide groove 5a to thereby position upper portion 61 in guide groove 5a. Therefore, the thickness of bottom 5f of guide groove 5a is larger so as to ensure the strength of guide groove 5a. Accordingly, the weight of sole 5 increases and thus the weight of golf club head 10 increases. Except for this, golf club head 10 in Modification 2 of an embodiment of the present invention can also provide functions and effects similar to the above-described functions and effects of golf club head 10 in an embodiment of the present invention.

Figure 10:
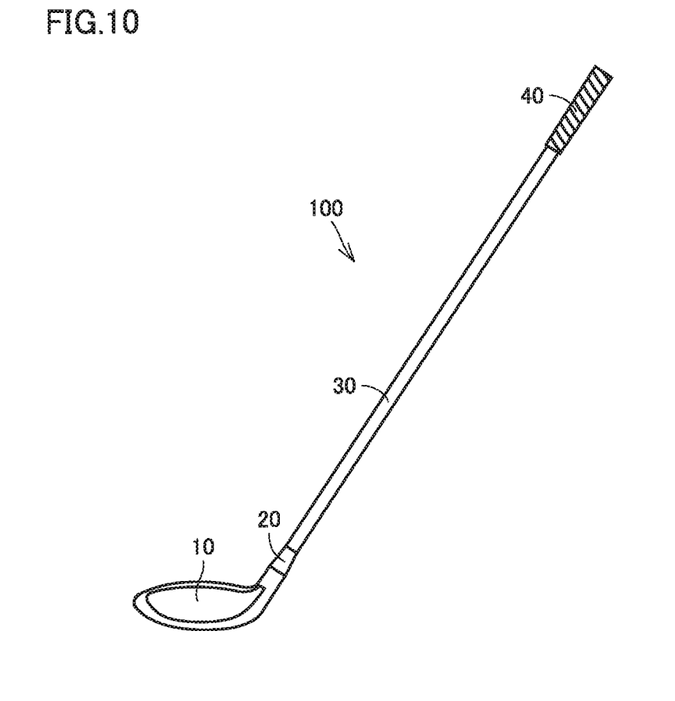
FIG. 10 is a perspective view schematically showing a configuration of a golf club in an embodiment of the present invention.

Next, referring to FIG. 10, a configuration of a golf club in an embodiment of the present invention is described.

As shown in FIG. 10, a golf club 100 in an embodiment of the present invention mainly includes a golf club head 10, a socket 20, a shaft 30, and a grip 40. Golf club head 10 combined with socket 20, shaft 30, and grip 40 forms golf club 100. Grip 40 is attached to one end of shaft 30. Golf club head 10 is attached to the other end of shaft 30 opposite to grip 40. As shaft 30 and grip 40, a known shaft and a known grip may be used. Socket 20 is attached to shaft 30 so that it is adjacent to hosel 7 of golf club head 10.

Next, functions and effects of golf club 100 in an embodiment of the present invention are described.

Golf club 100 in an embodiment of the present invention includes golf club head 10 according to any of an embodiment and modifications of the present invention as set forth above. It is therefore possible to provide golf club 100 equipped with golf club head 10 having weight member 6 adjustable to a desired position.

Respective golf club heads 10 of the above-described embodiment and modifications as well as golf club 100 in the embodiment can be combined appropriately.

While embodiments of the present invention have been described, it should be construed that the embodiments disclosed herein are given by way of illustration in all respects, not by way of limitation. It is intended that the scope of the present invention is defined by claims, and encompasses all modifications equivalent in meaning and scope to the claims.

What is claimed is:

1. A golf club head comprising:
   a face;
   a sole continuing from the face and including a guide groove having a plurality of positioning grooves; and
   a weight member including a plurality of protrusions, being positionally adjustable along the guide groove of the sole, and being positioned in the guide groove with the plurality of protrusions engaging with the plurality of positioning grooves,
   the plurality of positioning grooves each including a pair of sidewalls and a bottom connecting the sidewalls of the pair to each other,
   the sidewalls of the pair each being formed in an arc shape bulging outward from the bottom,
   the sidewalls of the pair being formed to be separated further away from each other as a distance from the bottom increases,
   the plurality of protrusions each including a pair of side surfaces and a ridge connecting the side surfaces of the pair to each other,
   the side surfaces of the pair each being formed in an arc shape receding inward from the ridge,
   the side surfaces of the pair being formed to be separated further away from each other as a distance from the ridge increases,
   wherein each of the side surfaces of the pair is larger in radius of curvature than each of the sidewalls of the pair.

2. The golf club head according to claim 1, wherein the plurality of positioning grooves and the plurality of protrusions each extend in a direction crossing a face back direction.

3. A golf club comprising:
   a shaft;
   a grip attached to one end of the shaft; and
   a golf club head according to claim 1, the golf club head being attached to another end of the shaft opposite to the grip.

4. A golf club head comprising:
   a face;
   a sole continuing from the face and including a guide groove having a plurality of positioning grooves; and
   a weight member including a plurality of protrusions, being positionally adjustable along the guide groove of the sole, and being positioned in the guide groove with the plurality of protrusions engaging with the plurality of positioning grooves, the plurality of positioning grooves each including a pair of sidewalls and a bottom connecting the sidewalls of the pair to each other, the sidewalls of the pair each being formed in an arc shape bulging outward from the bottom, the sidewalls of the pair being formed to be separated further away from each other as a distance from the bottom increases, the plurality of protrusions each including a pair of side surfaces and a ridge connecting the side surfaces of the pair to each other, the side surfaces of the pair each being formed in an arc shape receding inward from the ridge, the side surfaces of the pair being formed to be separated further away from each other as a distance from the ridge increases, wherein a pitch of the plurality of protrusions is an integral multiple of a pitch of the plurality of positioning grooves.

5. A golf club comprising:
a shaft;
a grip attached to one end of the shaft; and
a golf club head according to claim 4, the golf club head being attached to another end of the shaft opposite to the grip.

6. A golf club head comprising:
a face;
a sole continuing from the face and including a guide groove having a plurality of positioning grooves; and
a weight member including a plurality of protrusions, being positionally adjustable along the guide groove of the sole, and being positioned in the guide groove with the plurality of protrusions engaging with the plurality of positioning grooves, the plurality of positioning grooves each including a pair of sidewalls and a bottom connecting the sidewalls of the pair to each other, the sidewalls of the pair each being formed in an arc shape bulging outward from the bottom, the sidewalls of the pair being formed to be separated further away from each other as a distance from the bottom increases, the plurality of protrusions each including a pair of side surfaces and a ridge connecting the side surfaces of the pair to each other, the side surfaces of the pair each being formed in an arc shape receding inward from the ridge, the side surfaces of the pair being formed to be separated further away from each other as a distance from the ridge increases, wherein the guide groove includes a pair of inner walls facing each other, and a pair of flanges each projecting from a corresponding one of the inner walls of the pair in a direction in which the inner walls of the pair face each other, the flanges of the pair are each provided with the plurality of positioning grooves, and the weight member includes:
an upper portion;
a bottom portion disposed with the pair of flanges interposed between the upper portion and the bottom portion; and
a screw portion connecting the upper portion and the bottom portion to each other.

7. The golf club head according to claim 5, wherein
the upper portion includes:
a main body including a first surface and a second surface; and
a projecting portion connected to at least one end of the second surface of the main body, and
the projecting portion projects from the second surface of the main body in a direction away from the first surface.

8. The golf club head according to claim 5, wherein
the guide groove includes a bottom, and a wide portion disposed between the pair of flanges and the bottom,
a width of the wide portion is larger than a distance between the flanges,
a width of the bottom portion in a lateral direction is smaller than the distance between the flanges, and
a length of the bottom portion in a longitudinal direction is larger than the distance between the flanges and smaller than the width of the wide portion.

9. A golf club comprising:
a shaft;
a grip attached to one end of the shaft; and
a golf club head according to claim 6, the golf club head being attached to another end of the shaft opposite to the grip.

* * * * *

UNITED STATES PATENT AND TRADEMARK OFFICE
CERTIFICATE OF CORRECTION

PATENT NO. : 10,434,385 B2
APPLICATION NO. : 16/037043
DATED : October 8, 2019
INVENTOR(S) : Takayuki Mine et al.

Page 1 of 1

It is certified that error appears in the above-identified patent and that said Letters Patent is hereby corrected as shown below:

On the Title Page

Item (73) Assignee, please replace:
"Mizuno Technics Corporation, Osaka (JP)"
With:
- Mizuno Technics Corporation, Gifu (JP)
Mizuno Corporation, Osaka (JP) -

Signed and Sealed this
Fourteenth Day of July, 2020

Andrei Iancu
*Director of the United States Patent and Trademark Office*